United States Patent
Martin

[11] 3,797,512
[45] Mar. 19, 1974

[54] VACUUM REDUCER VALVE
[75] Inventor: Frank J. Martin, Ann Arbor, Mich.
[73] Assignee: Chrysler Corporation, Highland Park, Mich.
[22] Filed: Mar. 14, 1973
[21] Appl. No.: 340,991

[52] U.S. Cl.............................. 137/116.5, 123/117 A
[51] Int. Cl........................... G05d 11/00, F02d 5/02
[58] Field of Search....................... 137/116.3, 116.5; 123/117 A

[56] References Cited
UNITED STATES PATENTS
2,883,998   4/1959   Bloughton........................ 137/116.3
3,411,522   11/1968  Golden et al..................... 137/116.5
3,612,018   10/1971  Soberski......................... 123/117 A Primary Examiner—William R. Cline

[57] ABSTRACT

A three-chamber vacuum reducer valve is used in the distributor spark advance control system to provide a source of vacuum for advancing the spark firing during engine overheat conditions. The source of vacuum is greater than the ported spark vacuum found upstream of the throttle plate in a carburetor intake and less than the manifold vacuum. One input to the reducer is the manifold vacuum and the other input is atmospheric pressure which are combined by means of a regulator in the valve for producing an output vacuum which is reduced from the manifold vacuum.

4 Claims, 7 Drawing Figures

PATENTED MAR 19 1974

VACUUM REDUCER VALVE

BACKGROUND OF INVENTION

1. Field of Invention

This invention relates to vacuum valves in general and more particularly to a vacuum reducer valve for producing an output vacuum at a predefined vacuum level below an input vacuum.

2. Prior Art

U. S. Pat. No. 2,883,998 teaches a vacuum system having a diaphragm operated vacuum control valve for maintaining a steady and constant vacuum in the system. When the vacuum in the system becomes less than the controlled value, the diaphragm operates to open a poppet valve thereby connecting a vacuum source to the syytem. When the system has reached the desired vacuum level the diaphragm operates to close the poppet valve. If the vacuum in the system rises beyond the desired level, the diaphragm operates to admit atmospheric pressure into the system thereby reducing the vacuum level. This valve operates to maintain the vacuum at a constant level.

SUMMARY OF INVENTION

It is a principal object of the invention to maintain the output of a vacuum reducer valve at a predetermined vacuum differential from an input source.

It is another object of the invention to isolate the vacuum source and the atmospheric source from each other in a vacuum reducer valve.

These and other objects will become apparent from the following drawings, description and claims of a three-chamber vacuum reducer valve. One chamber is connected to a source of atmospheric pressure and is interconnected through a valve seat and dump valve actuated to a second chamber. The second chamber is connected to a vacuum utilization means and the third chamber, isolated from the second chamber by means of a flexible diaphragm having a valve seat in line and cooperating with the dump valve actuator, is connected to a source of vacuum.

The dump valve actuator is responsive to the source of atmospheric pressure and to the vacuum source to maintain the vacuum in the second chamber at a predetermined differential level from the input vacuum. This level is determined by means of a regulator in the third chamber which operates to move the diaphragm between an atmospheric source and a vacuum source.

DETAILED DESCRIPTION

Figure 1:
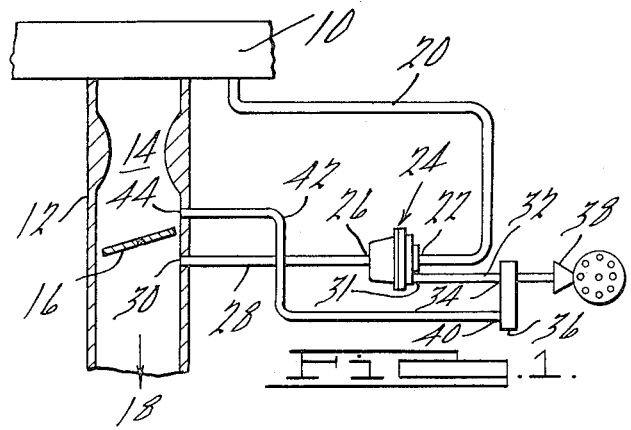
FIG. 1 is a schematic of a carburetor system incorporating the vacuum reducer valve controlling the distributor advance vacuum motor.
Figure 2:
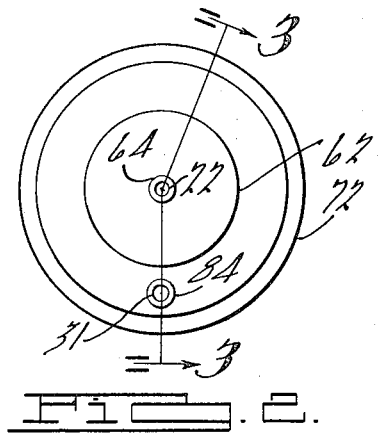
FIG. 2 is a top view of the vacuum reducer valve.

Referring to the figures by the characters of reference there is illustrated in FIG. 1 a schematic of a carburetor system as may be used with an internal combustion engine. The purpose of the system of FIG. 1 is to control the distributor advance vacuum motor thereby controlling the firing point of the fuel in the cylinders of the engine. An air cleaner 10 is positioned over the top of a carburetor intake conduit 12 for cleaning the air which flows along the conduit through the venturi section 14 past the throttle plate 16 and to the manifold 18. Secured to the air cleaner on the clean air side is a conduit 20 which may be rigid or flexible for supplying clean air at atmospheric pressure to one input 22 of the vacuum reducer valve 24 of the present invention. A second input 26 to the vacuum reducer valve is connected by means of another conduit 28 to a vacuum source 30 in the air intake conduit 12. This vacuum source 30 is downstream from the throttle plate 16 and supplies a vacuum source hereinafter referred to as the manifold vacuum. The output 31 of the vacuum reducer valve 24 is connected by means of a third conduit 32 to one input 34 of a thermal switch 36 and from there to the distributor advance vacuum motor 38. Another input 40 to the thermal switch 36 is connected by means of a conduit 42 to the ported spark vacuum source 44 in the carburetor intake conduit 12.

In an internal combustion engine, the manifold vacuum is at a large value in terms of inches of mercury at idle condition of the engine and decreases to substantially zero vacuum at wide open throttle condition. It is the function of the vacuum reducer valve 24 to supply an output vacuum at a predetermined vacuum differential level from that of the manifold vacuum or input vacuum. In a decreasing vacuum condition, in order to provide this output vacuum it is necessary to mix or dilute, under controlled conditions, the manifold vacuum as supplied to the vacuum reducer valve 24 with air at atmospheric pressure. In an increasing vacuum condition, the reducer valve 24 supplies vacuum from the vacuum source 30. This reduced vacuum is supplied through a thermal vacuum switch 36 to the distributor advance vacuum motor 38. The thermal vacuum switch 36, in one embodiment, is sensitive to engine coolant temperatures and will connect the output of vacuum reducer valve 24 to the distributor advance vacuum motor 38 whenever the engine coolant temperatures reach an abnormally high temperature. Normally the vacuum being applied to the distributor advance vacuum motor 36 is a much lower vacuum such as that at the ported spark output 44 of the carburetor intake conduit 12 upstream of the throttle plate 16 as illustrated in FIG. 1 or from the venturi section 14 of the intake conduit. In either case, this vacuum is much lower than the manifold vacuum. However, in a system wherein the thermal switch 36 senses that the cooling system temperatures are above a predetermined level, it is necessary to advance the firing of fuel in the cylinders of the engine thereby lowering the engine temperature. This is accomplished by the thermal switch 36 switching the higher vacuum output from the vacuum reducer valve 24 into the distributor advance vacuum motor causing the spark to be advanced. Under these conditions, advancing the spark results in earlier detonation of the fuel and, therefore, a more efficient conversion of fuel into mechanical energy instead of heat energy.

As previously indicated, during normal driving conditions, the distributor vacuum advance is controlled directly by the ported spark vacuum 44, however, under certain load, speed or weather conditions, this is affectively a retard operation increasing the heat rejection to the engine coolant and causing the engine to run hotter. Under these conditions, the distributor spark control must be advanced to reduce this added heat load. If the thermal switch 36 connected the manifold vacuum to the distributor vacuum advance, an excessive amount of advance will be produced and the engine will knock. The vacuum reducer valve 24 provides a vacuum that is a predetermined vacuum differential less than the manifold vacuum to advance the engine firing enough to lower its coolant temperature but not advancing the engine firing enough to cause the engine to knock.

Figure 3:
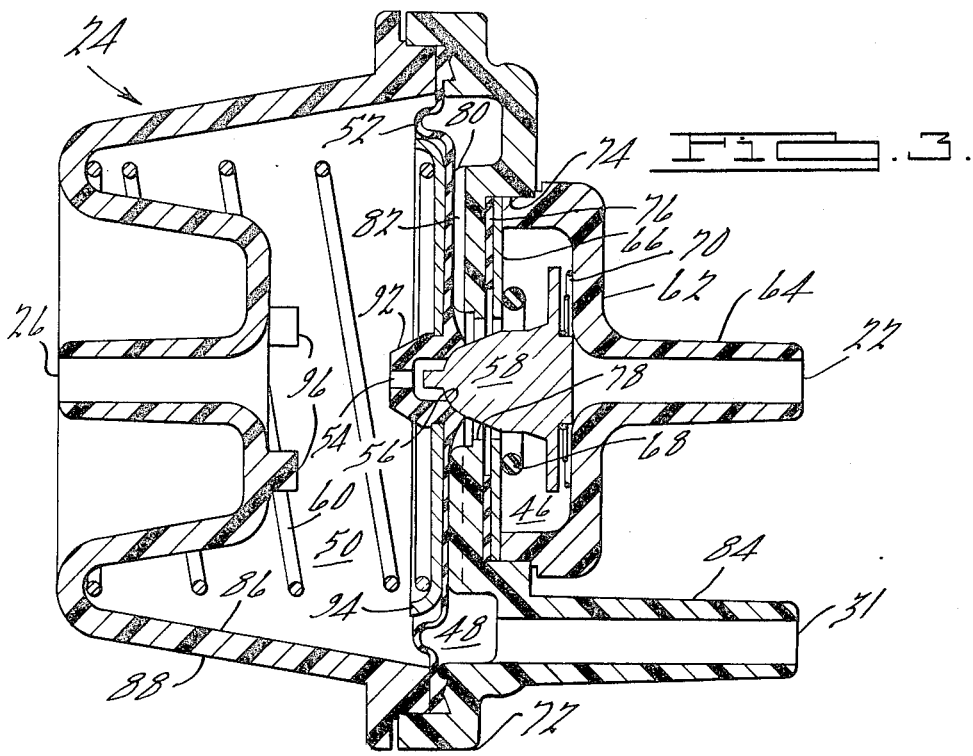
FIG. 3 is a sectional view taken along line 3—3 of FIG. 2.
Figure 4:
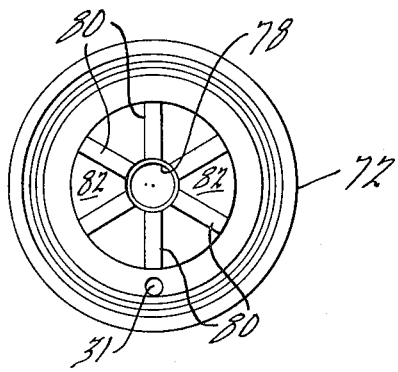
FIG. 4 is a plan view of the inside of the cover member of the valve of FIG. 2.

Referring to FIG. 3, there is illustrated a cross-sectional view of the preferred embodiment of the vacuum reducer valve 24. In general, the valve has a first chamber 46 with an input port 22, a second chamber 48 with an output port 31 which is the output port of the valve 24 and a third chamber 50 with an input port 26. Interposed in the space between and separating the second and third chambers 48 and 50 is a flexible diaphragm 52 with a centrally located flow passageway 54 and valve seat 56. Located in the first chamber 48 is a dump valve 58 controlling the fluid communication between the first and second chambers and, as will be shown, also controls the fluid communication between the second and third chambers. Located in the third chamber 50 is a regulator means 60 biasing the diaphragm 56 in a first position.

The first chamber 46 is defined by a tubular cylindrical inside cover member 62 enclosed at one end. Located along the axis of the cover member 62 is the input port 22 having a nipple extension 64 for connecting a conduit thereto. The open end of the chamber is enclosed by means of a bearing plate 66 having a centrally located aperture axially in line with the input port 22. Positioned within the first chamber 46 and extending through and beyond the aperture in the bearing plate 66 is the dump valve member or spool 58. The dump valve member 58 cooperates with an O-ring 68 for sealing the first chamber preventing fluid flow out of the aperture. Additionally, biasing means 70 cooperates with the spool and the enclosed surface sf the first chamber for biasing the spool 58 toward said aperture.

The second chamber 48 is defined by a tubular cylindrical member 72 enclosed at one end. In the preferred embodiment, this cylindrical member 72 is also the outside cover member and the inside cover member 62 nests within and is bonded to a cylindrical cavity 74 therein. Before bonding the two cover members 62 and 72 together, a resilient gasket member 76 is positioned between the bearing plate 66 and the bottom of the cavity 74 forming a seal. Axially positioned in the enclosed end of the second chamber and aligned with the output port of the first chamber is the input port 78 to the second chamber. Positioned along the surface of the enclosed end are a plurality of raised spaced apart radially extending diaphragm stop members 80. Between each adjacent stop member 80 is a fluid flow passageway 82 extending from the input port 78 radially to the side walls of the chamber 48.

The output port 31 of the valve 24 is formed in the enclosed end of the second chamber 48 and is adjacent the side wall of the chamber. A nipple extension 84 extends the output port 31 providing means to attach a conduit thereto to a vacuum utilization means. The particular positioning of the output port 31 in the second chamber 48 is not limited to the enclosed end of the chamber but by this positioning the overall size of the valve 24 in general, and the chamber 48, in particular, is compact.

The third chamber 50, which in the preferred embodiment is the largest chamber, is formed by a cavity 86 in the main body member 88 of the valve. An input port 26 is positioned in the end wall of the body member 88 and is extended outwardly of the body member by a nipple extension 90 for attaching a conduit thereto from a vacuum source. The open end of the body member 88 is enclosed by the flexible diaphragm 52 held in place around its periphery by the rims of the body member 88 and outside cover member 72.

The flexible diaphragm 52 has an axially located button 92 having a vacuum flow passageway 54 therethrough. The side of the diaphragm button 92 adjacent to the second chamber forms a valve seat 56 for the dump spool 58 extending from said first chamber 46. A spring receiving cup member 94 is positioned against the broadside of the diaphragm 52 facing the third chamber and is secured thereto by the button 92. The spring receiving cup member 94 receives a regulating means 60 or compression spring that is located in the third chamber 50 and biases the diaphragm in a normal first position against the diaphragm stop member 80 in the second chamber 48. A second set of diaphragm stop members 96 are spaced around the input port 26 in the third chamber 50 for preventing the diaphragm 52 from sealing the input port 26.

Figure 5:
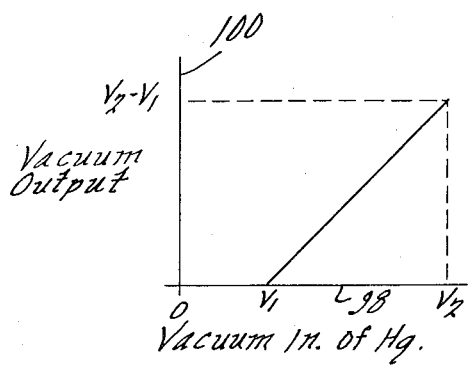
FIG. 5 is a graph of the operation of the vacuum reducer valve.

Referring to FIG. 5, there is graphically illustrated the operation of the vacuum reducer valve 24. Along the abscissa 98 of the graph, the vacuum input to the third chamber is plotted in inches of mercury and along the ordinate 100 of the graph, the vacuum output of the reducer valve 24 is plotted in inches of mercury. The reducer valve 24 is designed to produce a vacuum output that is predetermined vacuum level lower, $V_1$ on the graph, than the input vacuum. Thus, for a vacuum $V_2$ on the input, the output is $(V_2 - V_1)$. In the present embodiment, $V_1$ is equal to 3.5 inches of mercury.

Operation of Reducer

Figure 6:
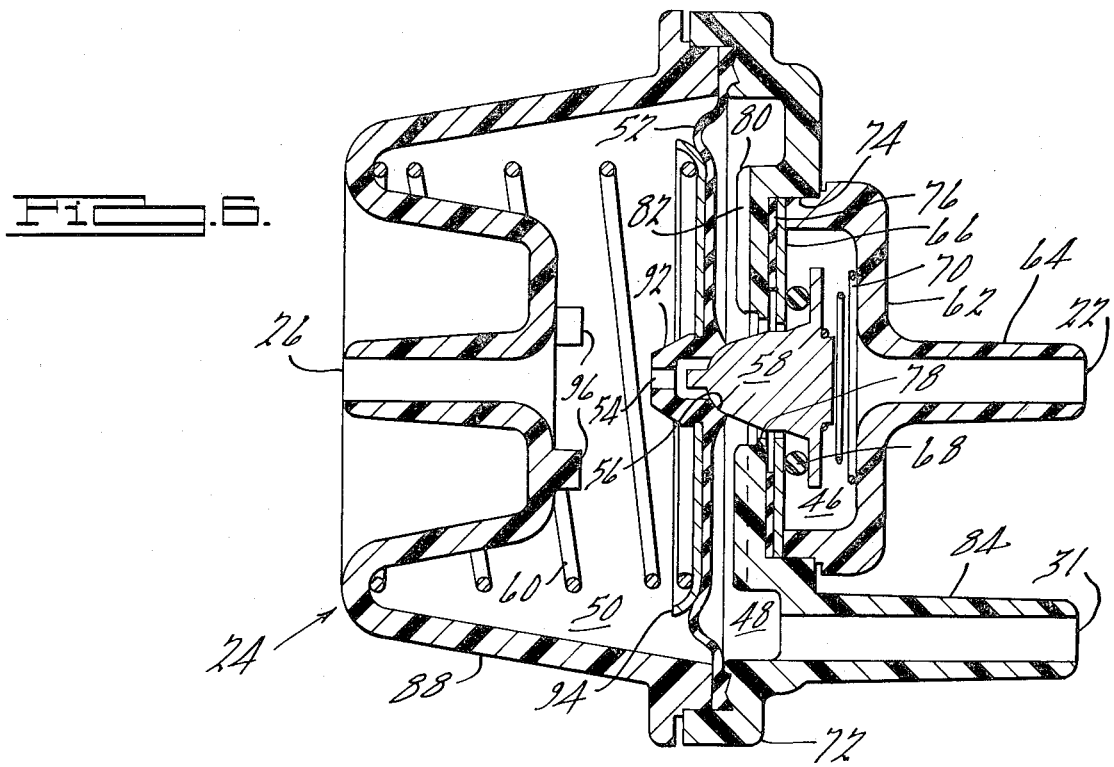
FIG. 6 is a sectional view similar to that of FIG. 3 with the diaphragm in an intermediate position.
Figure 7:
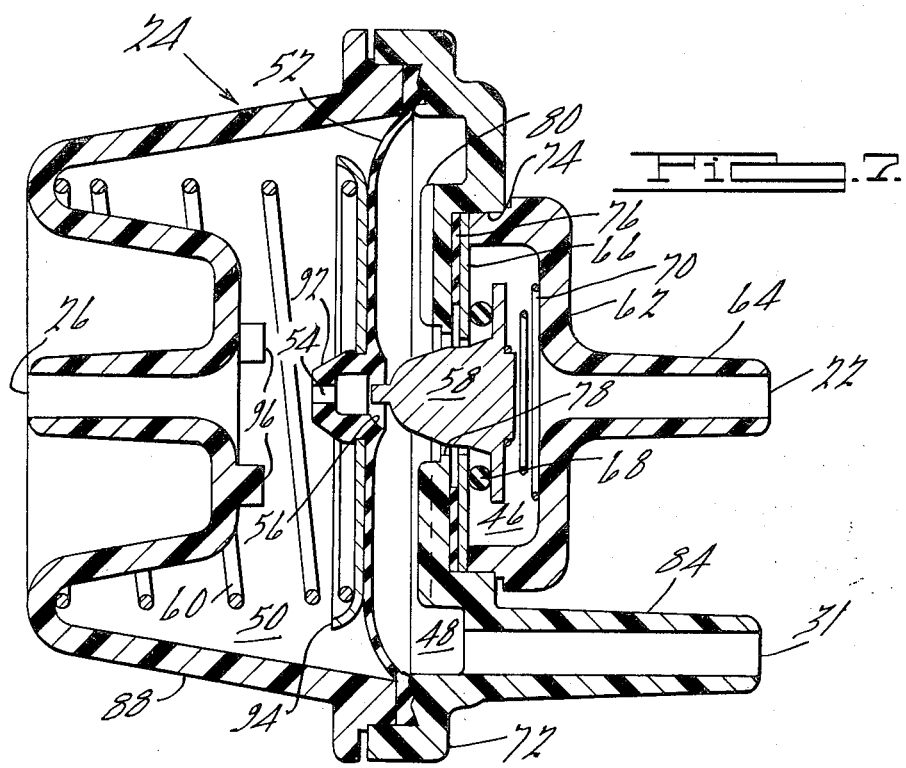
FIG. 7 is a sectional view similar to that of FIG. 3 with the diaphragm in the second extreme position.

The reducer valve diaphragm 52 has three basic operating positions. These three positions are illustrated in FIGS. 3, 6, and 7. The first position is illustrated in FIG. 3 and is the normal or rest position where the vacuum source is at zero inches of mercury. The diaphragm 52 is biased against the stop members 80 in the second chamber 48 and the dump valve 58 is held open by the diaphragm 52. In this first position, there is fluid communication between the input port 22 to the first chamber 46 through the fluid flow passageways 82 to the output port 31 of the second chamber 48.

As the vacuum source increases from zero inches of mercury, the force of the atmospheric pressure entering the first chamber pushes against the dump spool 58 and the diaphragm 52 to move the diaphragm away from the first position. During this portion of the diaphragm move, the dump valve spool 58 and the valve seat 56 in the diaphragm remain in a sealed relationship. The biasing spring 70 in the first chamber 46 functions to maintain the dump valve spool 58 and the valve seat 56 in this sealed relationship.

When the vacuum at the vacuum source reaches the desired vacuum differential, $V_1$ in FIG. 5, the reducer valve 24 is in its second position as illustrated in FIG. 6. In this position, both the first and third chambers 46 and 50 are sealed from fluid communication with any other chamber in the reducer valve 24. This second position is the equilibrium position of the reducer valve whenever the input vacuum exceeds the output vacuum by the predetermined vacuum differential $V_1$. The compression spring force 60 in the third chamber 50 is at its working length maintaining the vacuum level in the second chamber 48 at the predetermined vacuum differential less than the vacuum source in said third chamber 50.

As the input vacuum increases along the abscissa in FIG. 5 beyond the point $V_1$, the diaphragm 52 begins to modulate about the second position and will move toward a third position as illustrated in FIG. 7. This position is a temporary position in that whenever the pressure or vacuum in the second chamber 48, the output vacuum, for a given input vacuum falls on the graph plot of FIG. 5, the regulating means 60 will move the diaphragm 52 back to the second position. If the vacuum sum of the atmospheric pressure and the vacuum in the second chamber 48 is greater than the sum of the input vacuum and the calibration of the regulating means 60, the diaphragm will modulate toward the first position. This modulation will bring the dump valve spool 58 and the diaphragm valve seat 56 into a sealed relationship closing off fluid communication between the third and second chambers 50 and 48. The regulating means 60 will then continue to move the diaphragm 52 toward the first position until the dump valve spool 58 and the O-ring 68 seal is broken admitting atmospheric pressure to the second chamber 48. When the output vacuum falls on the graph plot, the diaphragm 52 returns to its second position as illustrated in FIG. 6.

If suddenly a large vacuum was placed on the input 26 to the third chamber 50 which was large enough to collapse the regulating means 60, the diaphragm stops 96 around the input port 26 would prevent the flexible diaphragm 52 from sealing the port. As soon as the spring 60 recovered, the diaphragm would move toward its second position to bring the output to its desired value.

There has thus been shown and described a vacuum reducer valve 24 for maintaining the output of the valve within a predetermined vacuum differential from the input vacuum source. As the input vacuum varies, the flexible diaphragm 52 cooperates with a dump valve 58 to modulate the output vacuum providing the correct mixture of atmospheric pressure and vacuum to maintain the desired vacuum output.

What is claimed is:

1. A vacuum reducer valve for regulating the vacuum supplied to a vacuum motor within a predetermined vacuum differential of a vacuum source, said reducer comprising:

a first chamber having an input port for connection to a source of atmospheric pressure and an output port;

a second chamber having an input port connected to the output port of said first chamber and having an output port for connection to a utilization means;

a third chamber having an input port for connection to a source of vacuum pressure;

a flexible diaphragm having a centrally located flow passageway integral with a valve seat, said diaphragm sealingly separating said second and third chambers whereby said flow passageway provides for fluid communication between said second and third chambers;

stop means located in said second chamber for locating said diaphragm in a first position;

a dump valve located in said first chamber and extending through said output port of said first chamber and biased into contact with said valve seat in said diaphragm, said dump valve responsive to the source of atmospheric pressure connected to said input port of said first chamber for moving said diaphragm from said first position closing said flow passageway therein and fluidly interconnecting said first and second chambers to a second position for closing the output port of said first chamber and before opening said flow passageway and fluidly interconnecting said second and third chambers; and regulating means located in said third chamber and connected to said diaphragm responding to said vacuum source to modulate said diaphragm thereby opening and closing said flow passageway therein for maintaining the vacuum level in said second chamber within a predetermined vacuum differential less than the vacuum source connected to said third chamber.

2. A vacuum reducer valve according to claim 1 wherein said regulating means is a compression spring calibrated at its working length to maintain the vacuum level in said second chamber at a predetermined vacuum differential less than the vacuum source in said third chamber.

3. A vacuum reducer valve according to claim 1 additionally including a second set of stop means located around the input port of said third chamber for preventing said diaphragm from sealing said input port.

4. A vacuum reducer valve according to claim 1 wherein said first, second and third chambers are integrally connected forming a unitary valve body.

* * * * *